(12) United States Patent
Liberman

(10) Patent No.: US 12,145,867 B2
(45) Date of Patent: Nov. 19, 2024

(54) ENVIRONMENTALLY FRIENDLY SEA WATER INTAKE SYSTEM

(71) Applicant: IDE WATER TECHNOLOGIES LTD, Kadima (IL)

(72) Inventor: Boris Liberman, Kadima (IL)

(73) Assignee: IDE Water Technologies LTD, Kadima (IL)

( * ) Notice: Subject to any disclaimer, the term of this patent is extended or adjusted under 35 U.S.C. 154(b) by 598 days.

(21) Appl. No.: 17/608,845

(22) PCT Filed: May 21, 2020

(86) PCT No.: PCT/IB2020/054825
§ 371 (c)(1),
(2) Date: Nov. 4, 2021

(87) PCT Pub. No.: WO2020/240359
PCT Pub. Date: Dec. 3, 2020

(65) Prior Publication Data
US 2022/0315451 A1    Oct. 6, 2022

(30) Foreign Application Priority Data
May 31, 2019 (GB) .................................... 1907713

(51) Int. Cl.
*C02F 1/38* (2023.01)
*C02F 1/00* (2023.01)
(Continued)

(52) U.S. Cl.
CPC ................ *C02F 1/38* (2013.01); *C02F 1/004* (2013.01); *E02B 1/006* (2013.01); *F04B 47/00* (2013.01); *C02F 2103/08* (2013.01); *C02F 2301/026* (2013.01); *C02F 2303/24* (2013.01); *E02B 9/04* (2013.01)

(58) Field of Classification Search
CPC ... C02F 1/38; B04B 5/00; E02B 1/006; E02B 5/085; E02B 8/08; E02B 9/04; F04B 47/00
See application file for complete search history.

(56) References Cited

U.S. PATENT DOCUMENTS
2012/0125829 A1   5/2012   Wallace

FOREIGN PATENT DOCUMENTS
RU         2250300 C1        4/2005

OTHER PUBLICATIONS

Written Opinion of the International Searching Authority, International Application No. PCT/IB2020/054825, Mailing Date Dec. 3, 2020.

*Primary Examiner* — Bradley R Spies
(74) *Attorney, Agent, or Firm* — Fresh IP PLC; Clifford D. Hyra; Aubrey Y. Chen

(57) ABSTRACT

A sea water intake system comprising a main sea water intake pipe, one end of the sea water intake pipe being provided with a centrifugal chamber, the chamber having at least one tangential inlet for entry of sea water to cause rotation of the sea water in the chamber. The other end of the intake pipe terminates in a sump, the sump having a water level lower than that of sea level and having a pump to transport sea water from the sump through a delivery pipe to a treatment plant. A central region of the centrifugal chamber is in fluid communication with a substantially vertical airlift pipe having an air inlet at, or close, to the chamber and a water exit remote from the chamber.

13 Claims, 10 Drawing Sheets

(51) Int. Cl.
  *E02B 1/00* (2006.01)
  *E02B 9/04* (2006.01)
  *F04B 47/00* (2006.01)
  *C02F 103/08* (2006.01)

ENVIRONMENTALLY FRIENDLY SEA WATER INTAKE SYSTEM

This invention relates to a sea water intake system for delivering sea water to a treatment plant, such as a desalination plant.

BACKGROUND TO THE INVENTION

Water treatment systems such as seawater desalination facilities and power plants that require an intake of water from sea water include an intake unit for delivering water from its source (e.g. sea) to the system, and a pre-treatment unit for removing floating and suspended material from the delivered water, in order to prepare the water for the main RO membrane process.

There are many different types of intake system but two intake types are more common: open intakes and infiltration intakes (or infiltration galleries). Open intakes draw water via piping directly from the water body. Open intakes typically employ screen meshes between 20 mm to 1 mm to filter out large debris and prevent fish or other marine life from being drawn into the system, such as the desalination system. However, millions of fish and other small marine organisms, are sucked into the piping or smear on the screen, leading to considerable damage, both to the environment and to facilities. Damage is inflicted on both large aquatic organisms such as fish or crabs that are trapped against the intake screens and drown or suffocate, and on small marine organisms such as fish, fish eggs or larvae that are drawn into the intake system and cause biofouling on the plant equipment.

Infiltration intakes, or galleries, are built in the seabed by the installation of horizontal drain systems. The drain system is placed in the natural filtration media sand, or cracked stone or other water permeable natural media and the seawater is slowly filtered by it. This media is naturally cleaned by waves and storms. Horizontal drain systems deliver water to the pumping station located on the seashore. Infiltration galleries, while protecting the marine environment, can only be installed in areas with naturally occurring medias. Furthermore, a huge area of sea is required and the filtration velocity is typically very slow. After a certain period of time, flow is diminished and a new area has to be selected for intake.

Ranney wells are also used to provide lateral screens for water intake. A caisson is constructed into the sand below surface level and the screened conduits extend horizontally from ports in the caisson to provide an infiltration gallery with a single central withdrawal point. However, this is only suitable for providing intake water to plants of small size.

Environmental Protection Agencies are requiring further improvements to intake units to minimize adverse environmental impacts, in particular reducing mortality to fish, fish eggs and other aquatic organisms. Water intakes conventionally impact most severely on early life stages of fish and shellfish through impingement and entrainment. It is desirable to reduce mortality of small fish, eggs and larva that are introduced into the intake units in addition to larger aquatic organisms.

It is an object of the present invention to provide an improved seawater intake unit that aims to reduce the mortality of aquatic life, in particular small fish, fish eggs and larva.

SUMMARY OF THE INVENTION

The present invention provides a sea water intake system comprising:

(a) a main sea water intake pipe;
(b) one end of the sea water intake pipe being provided with a centrifugal chamber, the chamber having at least one tangential inlet for entry of sea water;
(c) another end of the intake pipe terminating in a sump, the sump having a water level lower than that of sea level and having a pump to transport sea water from the sump through a delivery pipe to a treatment plant; and
(d) a substantially vertical airlift pipe in fluid communication with a central region of the centrifugal chamber, the airlift pipe having an air inlet at, or close, to the chamber and a water exit remote from the chamber.

The pump removes water from sump to deliver it to a treatment plant, such as a desalination plant. The level of the water in the sump, being lower than sea level, causes sea water to be sucked into the intake pipe through the at least one inlet of the chamber, causing rotation of the water within the chamber to cause accumulation of small marine life within the central section of the chamber. This marine life is not delivered to the main intake pipe because the vertical air lift pipe extending from the central section lifts the water in the central section containing the small marine life up through pipe where it is returned to the sea.

The chamber is preferably provided with multiple tangential inlets arranged around a vertical axis of the chamber whereby sea water rotates about the vertical axis. More preferably, the chamber is provided with multiple tangential inlets arranged around a horizontal axis of the chamber whereby sea water rotates about the horizontal axis. The at least one tangential inlet may be curved. The centrifugal chamber is preferably provided with multiple tangential or curved inlets around a periphery of the chamber for the passage of sea water into the interior of the chamber. The inlets may be, for example, in the form of slots directed at a tangent to the radius of the chamber or may be provided by channels between adjacent curved vanes. The direction of movement of the water through the inlets causes rotation of the water to provide a cyclonic effect.

As discussed above, rotation of the water in the chamber may be about a substantially horizontal or vertical axis. In a preferred embodiment, the chamber is arranged such that the axis of rotation of the water in the chamber is horizontal, i.e. the water rotates around a horizontal axis of the chamber.

Preferably, both the air-lift process and the centrifugal chamber are substantially free from moving parts in which marine life, in particular small fish and eggs, could become trapped, leading to injury or death.

The tangential inlets of the chamber may be protected by a mesh or screen, for example having apertures of around 50 mm×50 mm, to prevent entry of large marine life, such as big fish.

Preferably, an air compressor connected to an air pipe delivers air to the air inlet of the vertical pipe.

It is to be appreciated that the intake pipe may be provided with multiple centrifugal chambers in fluid communication with the main water intake pipe. Each chamber may have its own vertical airlift pipe or one or more chambers may share a common air lift pipe.

The main water intake pipe may also be provided with a branched capped oversized section, i.e. having a greater diameter than the rest of the intake pipe, for forming a pig launcher for insertion of a pig for cleaning purposes.

BRIEF DESCRIPTION OF THE DRAWINGS

Embodiments of the invention shall now be described, by way of example only, with reference to the accompanying drawings in which.

DETAILED DESCRIPTION OF THE INVENTION

The present invention provides an environmentally friendly intake process and system for the delivery of sea water to a treatment plant, such as a desalination plant. The intake unit has been developed to enable small marine life, such as small fish and eggs, to be expelled from the intake pipe without harm before the sea water is delivered to the treatment plant. Moreover, the process and system achieve this with minimal energy expenditure.

Figure 1:
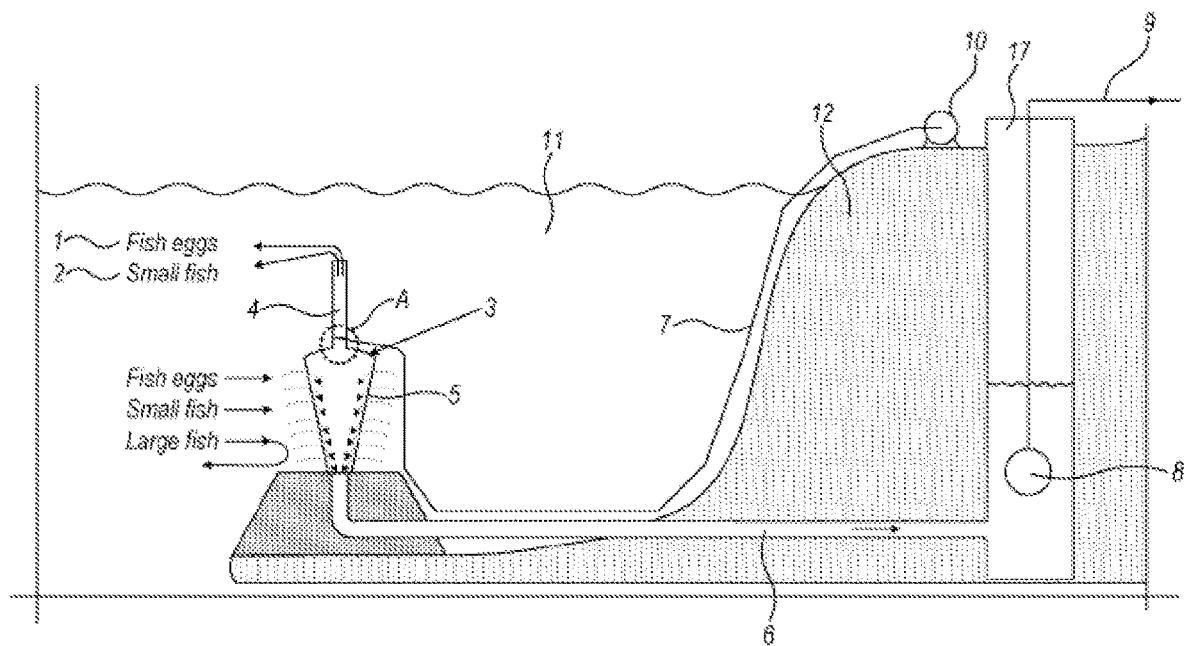
FIG. 1 is a schematic diagram of a sea water intake system according to one embodiment of the present invention.
Figure 2:
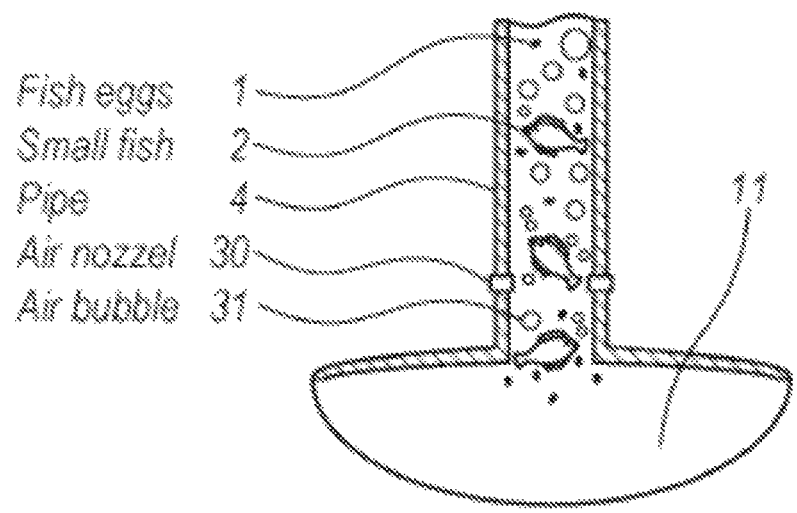
FIG. 2 is an expanded view of region A of FIG. 1, illustrating a small fish and marine life exit pipe.

FIGS. 1 and 2 of the accompanying drawing illustrate one embodiment of a water intake system according to the present invention. A main water intake pipe 6 extends under the sea 11 from land 12. The end of the intake pipe located out to sea terminates with a cyclone-inducing chamber 3 having multiple tangential water inlets 5 and the land-based end of the pipe terminates in a sump 17 provided with a pump 8 for pumping sea water through a water pipe 9 to a treatment plant. The level of water in the sump is lower than sea level causing water to be sucked through the inlets 5 into the main intake pipe 6. This movement of water through the curved water inlets results in water rotating within the chamber imparting a centrifugal force causing water of a heavier mass to move towards to the outside of the chamber with lighter water, including water containing small floating particles such as small fish and eggs, to be retained in the centre of the chamber.

Larger marine life, such a fish above a certain size, are prevented from entering the chamber, either due to the size of the inlets 5 or by the presence of a mesh screen across the inlets.

A vertical air lift pipe 4 extends from the centre of the chamber having an air inlet 30 connected to an air compressor 10 via an air pipe 7. The compressor injects compressed air through the air inlet at the bottom of the pipe which is immersed in the liquid. The compressed air mixes with the liquid causing the air-water mixture to be less dense than the rest of the liquid around it and therefore is displaced upwards through the discharge pipe by the surrounding liquid of higher density. Solids, such as small marine life 1, 2, may be entrained in the flow and will be discharged with the rest of the flow at top of the pipe. This air lift pipe delivers the water from the centre of the chamber 3 back to the sea and in doing so returns small marine life back to the sea without injury. The heavier water rotating around the chamber is sucked into the main intake pipe 6 for delivery ashore.

Figure 3:
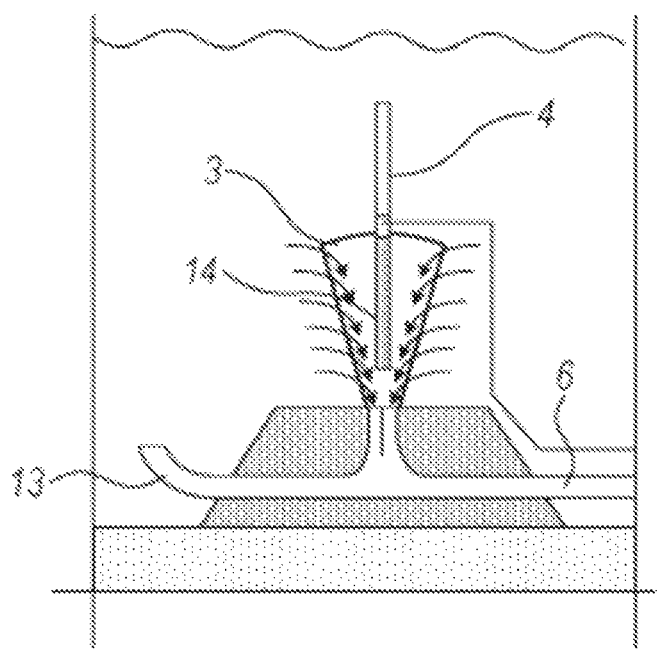
FIG. 3 is a schematic diagram of a part of a sea water intake system according to another embodiment of the present invention.

FIG. 3 of the accompanying drawings illustrates an intake pipe, vertical air life pipe and cyclone-inducing chamber for a sea water intake system according to one embodiment of the present invention. The chamber 3 and vertical air lift pipe 4 are substantially the same as those described in relation to FIG. 1 but the main intake pipe 6 is provided with a capped oversized end 13 remote from the chamber. This provides means for pigging the main pipe when it accumulates too much debris to allow for sufficient water flow. Pigging is the practice of using devices known as pigs or scrapers to perform various maintenance operations. This is done without stopping the flow of the product in the pipeline. A pig is inserted into a "pig launcher", the oversized section in the pipeline, reducing to the normal diameter. The pipe is then closed and the pressure-driven flow of the product in the pipeline is used to push the pig along down the pipe until it reaches the other end, known as the "pig catcher".

Figure 4A:
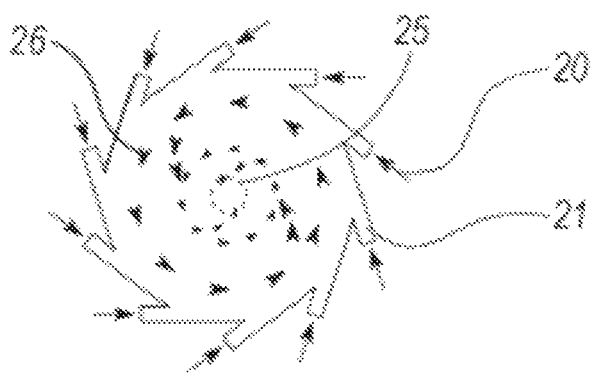
FIGS. 4A to 4C illustrate component parts of a sea water intake system of the present invention.
Figure 4B:
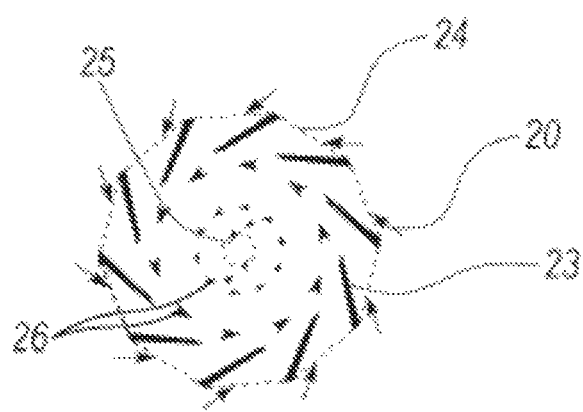
Figure 4C:
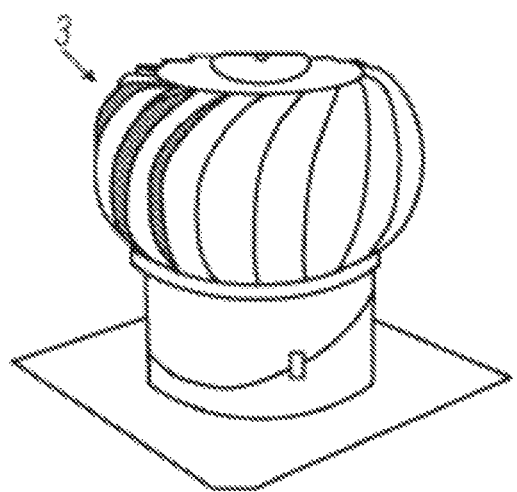

FIGS. 4A and 4B are cross sections of different types of chamber for inducing cyclonic water flow. FIG. 4C is a perspective view of the chamber shown in FIG. 4B. The chamber shown in FIG. 4A has inlet tubes 21 tangential to the flow of water. Water 20 enters through these tubes into the interior of the chamber and rotates around the chamber, as illustrated by arrows 26. Small fish and eggs accumulate in the central section 25 of the chamber due to the lower pressure. An airlift pipe (not shown) can then be attached to this section to return these organisms back to the sea. FIGS. 4B and 4B show an alternative chamber having straight or curved vanes 23 providing tangential inlets for entry of sea water 20 therebetween. A mesh or screen 24 is provided around the vanes to prevent entry of larger organisms. The vanes impart a swirling motion in the water (see arrows 26) to create a centrifugal force within the chamber, again causing small fish and eggs to accumulate in the central section 25.

Figure 5A:
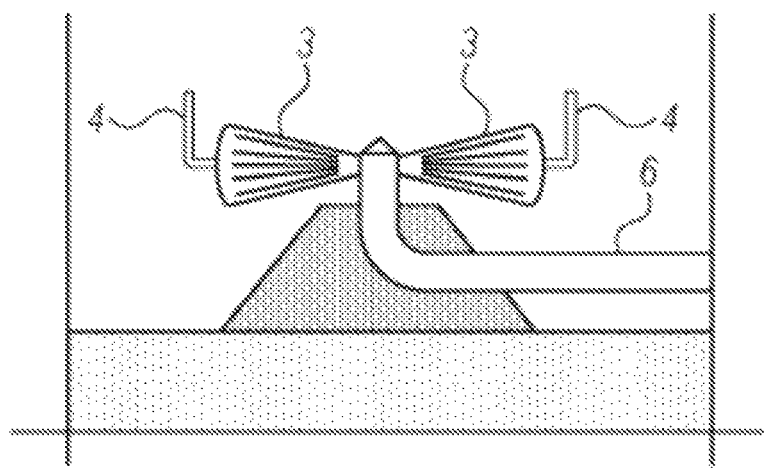
FIGS. 5A and 5B show respectively a side plan view and a top view of a part of a sea water intake system according to a further embodiment of the present invention.
Figure 5B:
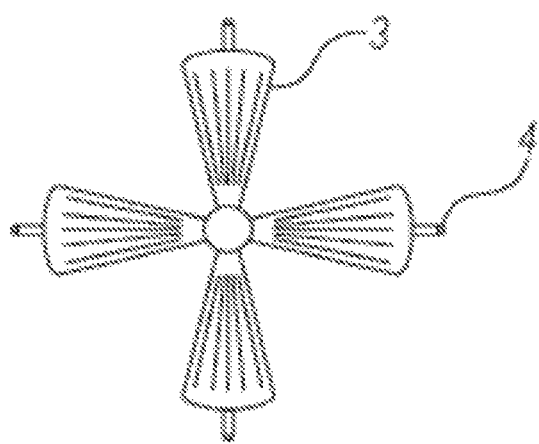
Figure 6A:
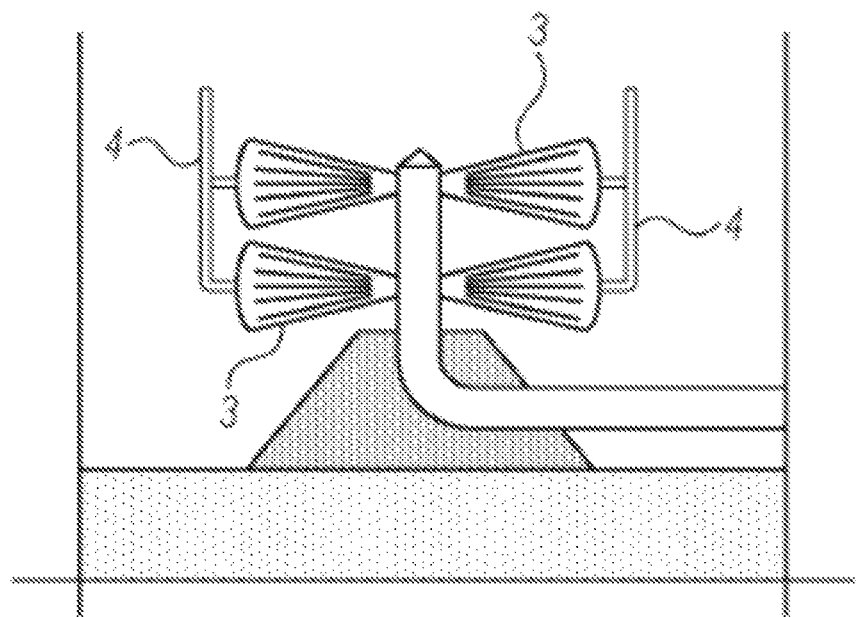
FIGS. 6A and 6B show respectively a side plan and a top view of a part of a sea water intake system according to yet a further embodiment of the present invention.
Figure 6B:
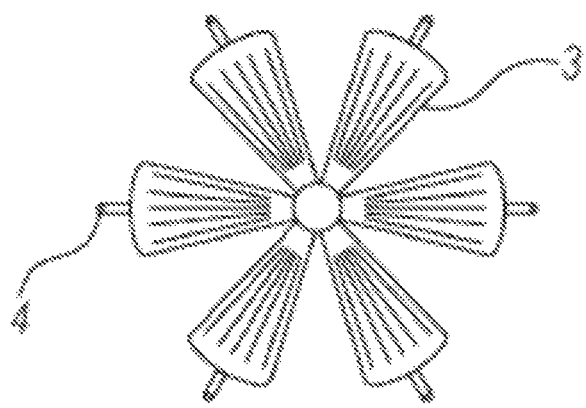

It is to be appreciated that various configurations of chambers and air lift pipes may be provided in the water intake system of the present invention. Two such examples are provided in FIGS. 5A-5B and 6A-6B. In FIGS. 5A and 5B four chambers are provided around the main centre intake pipe, each central section of each chamber having a vertically extending pipe. In FIGS. 6A and 6B, stacks or layers of the chambers are provided, with parallel chambers being connected to a common vertical airlift pipe. The rotational direction of the intake water in these chambers is about a horizontal axis. It has been found that this provides for better fish egg separation in the water over a vertical axis of rotation as shown in FIGS. 1-3.

Operation of the sea water intake system is as follows. The pump 8 removes water from sump 17 to deliver it to a treatment plant, such as a desalination plant. The level of the water in the sump is lower than sea level causing sea water to be sucked into the intake pipe 6 through the inlets in the chamber 3. The curved inlets causes rotation of the water within the chamber to cause accumulation of small marine life within the central section of the chamber. This marine life is not delivered to the main intake pipe because a vertical air lift pipe extends from the central section which lifts the water in the central section up through pipe where it is returned to the sea.

The invention claimed is:

1. A sea water intake system comprising:
   (a) a main sea water intake pipe;
   (b) one end of the sea water intake pipe being provided with a centrifugal chamber, the chamber having at least one tangential inlet for entry of sea water;
   (c) another end of the intake pipe terminating in a sump, the sump having a water level lower than that of sea level and having a pump to transport sea water from the sump through a delivery pipe to a treatment plant; and (d) a substantially vertical airlift pipe in fluid communication with a central region of the centrifugal chamber, the airlift pipe having an air inlet at, or close, to the chamber and a water exit remote from the chamber.

2. The sea water intake system as claimed in claim 1, wherein the chamber is provided with multiple tangential inlets arranged around a vertical axis of the chamber whereby sea water rotates about a vertical axis.

3. The sea water intake system as claimed in claim 1, wherein the chamber is provided with multiple tangential inlets arranged around a horizontal axis of the chamber whereby sea water rotates about a horizontal axis.

4. The sea water intake system as claimed in claim 1, wherein the at least one inlet into the centrifugal chamber is curved.

5. The sea water intake system as claimed in claim 2, wherein the multiple inlets are provided around a periphery of the chamber for the passage of sea water into the interior of the chamber.

6. The sea water intake system as claimed in claim 1, wherein the at least one tangential inlet to the chamber is in the form of slot directed at a tangent to the radius of the chamber.

7. The sea water intake system as claimed in claim 1, wherein the at least one tangential inlet to the chamber is provided by a channel between adjacent curved vanes.

8. The sea water intake system as claimed in claim 1, wherein the at least one tangential inlet of the chamber is protected by a mesh or screen to prevent entry of large marine life.

9. The sea water intake system as claimed in claim 1, wherein an air compressor is connected to an air pipe for delivering air to the air inlet of the vertical pipe.

10. The sea water intake system as claimed in claim 1, wherein the intake pipe is provided with multiple centrifugal chambers in fluid communication with the main water intake pipe.

11. The sea water intake system as claimed in claim 10, wherein each chamber has its own vertical airlift pipe extending from a central region thereof.

12. The sea water intake system as claimed in claim 10, wherein multiple chambers are in fluid communication with a common air lift pipe.

13. The sea water intake system as claimed in claim 1, wherein the main water intake pipe is provided with a branched capped section that is greater in diameter than the diameter of the rest of the intake pipe for forming a pig launcher in the pipe for insertion of a pig for cleaning purposes.

\* \* \* \* \*